(12) United States Patent
Querejeta Masaveu et al.

(10) Patent No.: US 10,101,750 B2
(45) Date of Patent: Oct. 16, 2018

(54) METHODS AND APPARATUS OF TRACKING MOVING TARGETS FROM AIR VEHICLES

(71) Applicant: The Boeing Company, Chicago, IL (US)

(72) Inventors: Carlos Querejeta Masaveu, Madrid (ES); Francisco A. Navarro Felix, Madrid (ES); Ernesto Valls Hernandez, Madrid (ES); Andrew Hayes, Madrid (ES)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 15/227,707

(22) Filed: Aug. 3, 2016

(65) Prior Publication Data

US 2017/0038781 A1 Feb. 9, 2017

(30) Foreign Application Priority Data

Aug. 4, 2015 (EP) .................................... 15382414

(51) Int. Cl.

| | | |
|---|---|---|
| *G01D 7/00* | (2006.01) | |
| *G05D 1/12* | (2006.01) | |
| *G05D 1/00* | (2006.01) | |
| *G05D 1/10* | (2006.01) | |
| *B64C 39/02* | (2006.01) | |
| *G08G 5/00* | (2006.01) | |

(52) U.S. Cl.
CPC ............ *G05D 1/12* (2013.01); *B64C 39/024* (2013.01); *G05D 1/0094* (2013.01); *G05D 1/101* (2013.01); *G08G 5/006* (2013.01); *B64C 2201/127* (2013.01); *B64C 2201/141* (2013.01); *G08G 5/0069* (2013.01)

(58) Field of Classification Search
CPC ........ G05D 1/12; G05D 1/101; G05D 1/0094; B64C 39/024; B64C 2201/141; B64C 2201/127; G08G 5/006; G08G 5/0069
See application file for complete search history.

(56) References Cited

U.S. PATENT DOCUMENTS

| | | | |
|---|---|---|---|
| 6,405,107 B1 * | 6/2002 | Derman ............... | G01C 21/005 340/3.5 |
| 9,684,309 B2 * | 6/2017 | Carter ...................... | G05D 1/12 |
| 9,852,642 B2 * | 12/2017 | Butler .................. | G08G 5/0039 |

(Continued)

FOREIGN PATENT DOCUMENTS

| | | |
|---|---|---|
| EP | 2071353 | 6/2009 |
| EP | 2083341 | 7/2009 |

OTHER PUBLICATIONS

European Patent Office, "Extended Search Report," issued in connection with European Patent Application No. 15382414.9, dated Jan. 28, 2016, 5 pages.

*Primary Examiner* — Ian Jen
(74) *Attorney, Agent, or Firm* — Hanley, Flight & Zimmerman, LLC (57) ABSTRACT

Methods and apparatus of tracking moving targets from air vehicles are disclosed. An example method in response to an estimated speed and an estimated location of a moving target, determines a detectability zone surrounding the moving target; and causes an air vehicle to follow the moving target outside of the detectability zone.

18 Claims, 6 Drawing Sheets

(56) References Cited

U.S. PATENT DOCUMENTS

| | | | |
|---|---|---|---|
| 2005/0060092 A1* | 3/2005 | Hablani | B64G 1/24 |
| | | | 701/472 |
| 2007/0250260 A1 | 10/2007 | Ariyur et al. | |
| 2010/0042269 A1 | 2/2010 | Kokkeby et al. | |
| 2012/0143505 A1* | 6/2012 | Giovannini | G08G 5/0052 |
| | | | 701/540 |
| 2016/0266582 A1* | 9/2016 | Carter | G05D 1/12 |

* cited by examiner

METHODS AND APPARATUS OF TRACKING MOVING TARGETS FROM AIR VEHICLES

RELATED APPLICATION

This patent claims priority to EP15382414.9 filed Aug. 4, 2015. EP15382414.9 is hereby incorporated herein by reference in its entirety.

TECHNICAL FIELD

This patent relates to methods and apparatus of tracking moving targets from air vehicles.

BACKGROUND

Unmanned aerial vehicles (UAV's) may be involved in tasks related to Intelligence, Surveillance and Reconnaissance (ISR) missions. These tasks may involve following and/or tracking a moving target (which may either be ground-based, air-based or sea-based) from the air vehicle for purposes such as, for example, border security, perimeter protection, wildlife monitoring, law enforcement, military operations or general purpose surveillance.

SUMMARY

An example method, in response to an estimated speed and an estimated location of a moving target, determines a detectability zone surrounding the moving target; and causes an air vehicle to follow the moving target outside of the detectability zone.

DETAILED DESCRIPTION

The present disclosure relates to example methods of tracking a moving target from an air vehicle. The example methods consider an area of likely detectability of the air vehicle by the moving target in such a way that the air vehicle performs its tracking mission while avoiding being detected by the moving target.

The example methods of the present disclosure are applicable in the field of civil and military operations involving surveillance and tracking of moving targets using air vehicles. The example methods are applicable in the field of aeronautic engineering and, more particularly, in the field of electronics and automatic regulation for avionics. However, the examples disclosed herein may be applicable in any field (e.g., fields other than civil and military operations).

Figure 2:
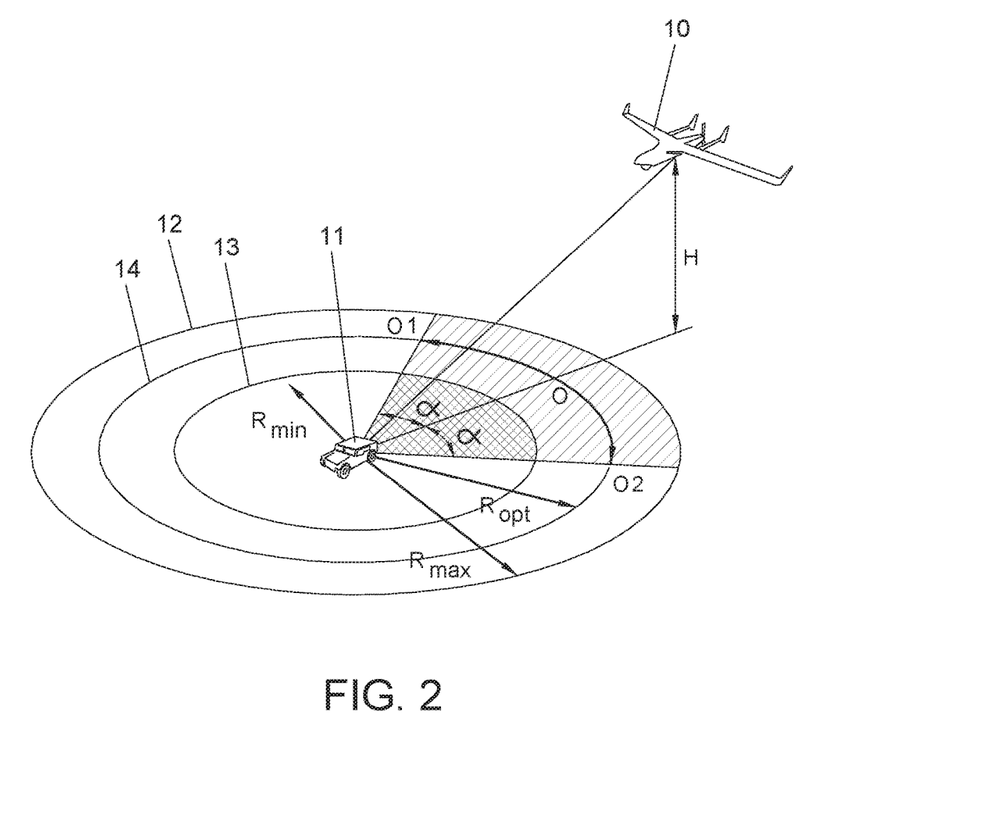
FIG. 2 shows a schematic view of an example air vehicle tracking a moving target from behind, in which the detectability area of the air vehicle has been represented.

As shown in the example of FIG. 2, the following is a description of example methods of tracking a moving target (11) (e.g., a Ground Moving Target—GMT-) from an air vehicle 10 (e.g., a UAV).

Figure 1:
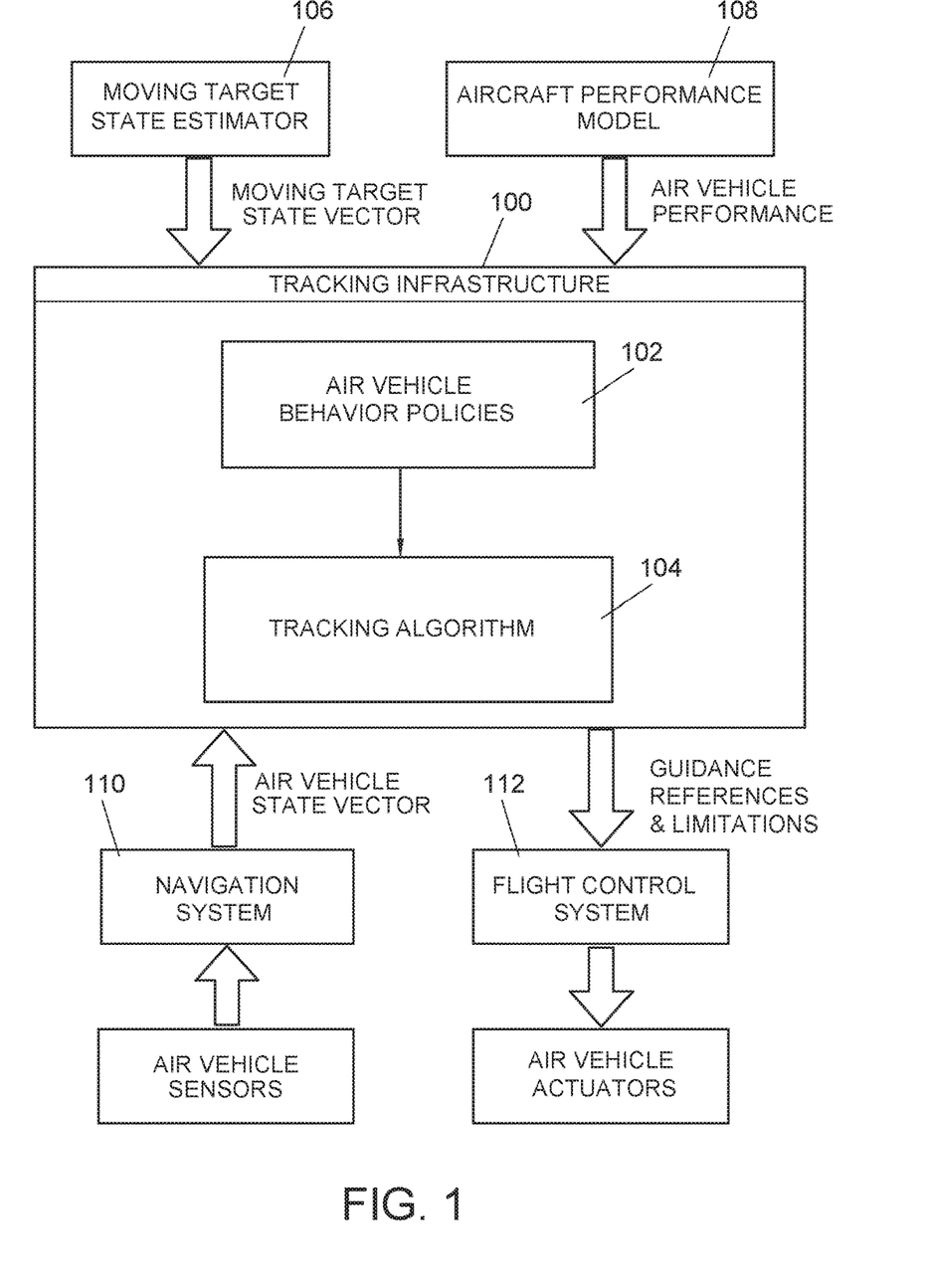
FIG. 1 shows a schematic diagram of example architecture modules for possible software/hardware implementation that can be used to implement the examples disclosed herein.

FIG. 1 shows an example schematic diagram in which different functional blocks represent architecture modules of a software/hardware implementation of the example methods described in the present disclosure.

According to FIG. 1, an example block 100 represents an architecture module, namely the example Tracking Infrastructure Module 100 for tracking of the moving target 11. In the illustrated example, the Tracking Infrastructure Module 100 includes two modules, e.g., an example Air Vehicle Behavior Policies Module 102 and an example Tracking Algorithm Module 104, which in FIG. 1 are represented by two boxes 102, 104 inside the Tracking Infrastructure Module 100. Referring to Figures. 1 and 2, the Tracking Algorithm Module 104 holds the example tracking/guidance algorithm that is used to generate guidance references towards which the air vehicle 10 is commanded to fly to track the moving target 11. In the illustrated example, the Air Vehicle Behavior Policies Module 102 comprises the behavioral policies of the air vehicle 10 that take into account, among others. The example Aircraft Performance Model (APM) 108 of the air vehicle 10 in which the present example method is implemented and a digital map of the terrain over which the air vehicle 10 flies are fed into the Tracking Algorithm Module 104.

In some examples, the tracking algorithm 104 is responsible to state the generic problem of solving the desired relative motion of the air vehicle 10 with respect to the moving target 11. The tracking algorithm provides the appropriate guidance references to the example Flight Control system (FC) 112 to actually exhibit such relative motion. In some examples, the generic problem is stated in terms of several parameters (e.g., detectability of the air vehicle 10, maximum and optimal distances of the air vehicle 10 with respect to the moving target, desired altitude, desired relative location (alpha angle, as will be described below), and also takes into account limitations stated on the air vehicle 10 performance (e.g., like maximum and minimum airspeeds, and roll, pitch and yaw angles). In some examples, the air vehicle 10 behavior policies accommodate user preferences that actually impose conditions or define parameters on which the tracking algorithm 104 is based (e.g., the aforementioned detectability distance, desired altitude, etc.).

In the illustrated example, the Tracking Infrastructure Module 100 comprises three inputs and one output. As shown in the example of FIG. 1, each of the inputs is respectively connected to an example Moving Target State Estimator Module 106, to an example Aircraft Performance Model Module 108 and to an example Navigation System Module 110. In other words, the Tracking Infrastructure Module 100 receives inputs from the Moving Target State Estimator 106, the Aircraft Performance Model 108 and the Navigation System Module 110. In the illustrated example, the output of the Tracking Infrastructure Module 100 is connected to an example Flight Control System (FC) Module 112. In other words, the Tracking Infrastructure Module 100 outputs data to the Flight Control System Module 112.

In some examples, the Moving Target State Estimator Module 106 represents an architecture module comprising components (e.g., sensors and other hardware/software, either onboard or not) for reliably estimating the current (updated) state of the moving target 11. The input that the Moving Target State Estimator Module 106 gives to the Tracking Infrastructure Module 100 is, in some examples, in the form of a moving target state vector. For the purposes of the present method, in some examples, it is considered that the estimation of the moving target 11 motion is given and/or accessible and is reliable. The moving target state vector may include information on position, speed and altitudes s (e.g., and sometimes their derivatives) of the moving target 11.

In the illustrated example, the Aircraft Performance Model Module 108 represents an architecture module comprising the air vehicle 10 performance model. Thus, the air vehicle 10 performance characteristics are given as an input from the Aircraft Performance Model Module 108 to the Tracking Infrastructure Module 100. In some examples, the air vehicle 10 performance is used by the tracking algorithm 104 to ensure or substantially ensure that the generated guidance references fall within the operational limits and/or flight envelope of the air vehicle 10 (e.g., the air vehicle 10 is capable of flying in accordance with the generated guidance references).

In the illustrated example, the Navigation System Module 110 provides access to an input to the Tracking Infrastructure Module 100 of the Air Vehicle State Vector. In some examples, the Navigation System Module 110 is connected to air vehicle 10 sensors.

In some examples, the Air Vehicle State Vector given as an input from the Navigation System Module 110 to the Tracking Infrastructure Module 100 comprises an air vehicle 10 position, speed and altitude (e.g., and their derivatives).

In the illustrated example, the Flight Control System Module 112 receives as an input the Guidance References (e.g., which in turn take into account the flight limitations given by the behavior policies and Aircraft Performance Model—APM—) which the Tracking Infrastructure Module 100 delivers as an output. Thus, in the illustrated example, the Flight Control System (FC) 112 is in charge of and/or causes the air vehicle 10 to fly towards the references generated by the tracking algorithm 104. In some examples, the FC System 112 is responsible for issuing signals to the air vehicle's actuators that drive the air vehicle's flight behavior. In other words, the FC System 112 causes the air vehicle 10 to fly in a particular route, trajectory, or pattern.

In some examples, the FC System 112 uses the guidance references to generate such signals.

In some examples, guidance references for guiding the air vehicle 10 are generated that represent and/or are associated with a certain course and/or speed vector for flying the air vehicle 10 and/or coordinates in the flying field surrounding the moving target 11. In some examples, the air vehicle 10 is instructed to fly in accordance with the guidance references. The guidance references may be given as an input to the Flight Control System (FC) 112 and may be based in a first instance on a reference location generated by the tracking algorithm 104. In some examples, the reference location is given with respect to the moving target 11, e.g., the reference system used for the purpose of generating coordinates of the reference location is, in some examples, a reference system centered on the moving target 11 so the coordinates of the reference location are given as a position vector with respect to the moving target 11.

Based on the reference locations generated by the tracking algorithm 104, in some examples, the tracking algorithm 104 calculates the guidance references that are given as an input to the Flight Control System 112.

In some examples, the Flight Control System (FC) 112 may use three different guidance references to fully determine the air vehicle motion. However, it may expose less than three to the user though. In some examples, one of the three references defines the lateral motion of the air vehicle 10. In some examples, the other two references define the vertical motion of the air vehicle 10. Thus, some guidance references define vertical motion and other guidance references define lateral motion.

In some examples, the guidance references may be selected among any combination of one or more of at least: 1) a desired and/or threshold course for the air vehicle 10 to fly towards the generated reference location; 2) a desired and/or threshold speed for the air vehicle 10 (either expressed as airspeed or groundspeed), to fly towards the reference location; and/or 3) a desired and/or threshold altitude for the air vehicle 10, for example.

As noted above, in some examples, some Flight Control Systems (FC) 112 may expose less than three guidance references. For example, some FC's may not receive as three input guidance references. For example, some Flight Control Systems may establish their own value for air vehicle speed once they have received inputs of a desired and/or threshold course and a desired and/or threshold altitude.

In some examples, a desired and/or threshold course for the air vehicle 10, a desired and/or threshold altitude for the air vehicle 10 and a desired and/or threshold speed for the air vehicle 10 are first calculated in terms of the reference location generated by the tracking algorithm 104. In some examples, the Flight Control System that receives the guidance references delivered by the tracking algorithm 104 may not have knowledge of the actual location and speed of the moving target 11. In such examples, the generated guidance references are translated from coordinates relative to the speed and location of the moving target 11 to absolute coordinates expressed in a Global Reference System, so they (e.g., absolute coordinates) can be delivered from the tracking algorithm 104 to the Flight Control System (FC) 112, in a manner that is fully understandable by the Flight Control System 112.

In some examples, the guidance references delivered to the Flight Control System (FC) 112 make the air vehicle 10 fly towards the reference location following a desired course.

In some examples, because the Flight Control Systems may enable receiving inputs of certain guidance references expressed through certain magnitudes or parameters, the example method underlying the present disclosure provides that the guidance references may be given by means of certain parameters. These example parameters may include any combination of one or more of at least : 1) a desired and/or threshold pitch and/or path angle; 2) a desired and/or threshold throttle; 3) a desired and/or threshold vertical speed; 4) a desired and/or threshold roll angle, and; 5) a particular waypoint (longitude and latitude), this waypoint being expressed in absolute coordinates (as explained above, in some examples, all guidance references are expressed in absolute coordinates for the guidance references to be understood by the Flight Control System).

Thus, in some examples, after generating the reference location, the tracking algorithm 104 calculates the guidance references and delivers the guidance references in terms of parameters (e.g., whether it be a particular waypoint in the flying field or any other type of parameter) expressed in terms of absolute coordinates. In some examples, the guidance references are delivered to the Flight Control System 112.

In some examples, as the moving target 11 moves (continuously or intermittently) the references generated are dynamic. Therefore the example method comprises dynamically generating new guidance references along the duration of the tracking mission and/or a substantial duration of the tracking mission. Therefore, in some examples, the example method iteratively calculates new guidance references.

In some examples, any parameters for defining the guidance references may be used, provided that the resulting guidance references are based on the reference location, and the reference location is calculated, in each iteration of the example method, as a relative position with respect to the current position of the moving target 11.

Therefore, in some examples, the trajectory that is followed by the air vehicle 10 changes and adapts dynamically, according to the moving target's position and speed. According to an example of the method of tracking a moving target 11 from an air vehicle 10, the tracking algorithm 104 calculates the guidance references based on at least two main criteria: 1) avoiding detection of the air vehicle 10 by the moving target 11 being tracked/followed, and; 2) avoiding loss of visual and/or sensor detection contact with the moving target 11 by the air vehicle 10.

In some examples, apart from the mentioned criteria on which the tracking algorithm 104 bases the calculation of the guidance references, the example behavior policies may also provide information on limitations that affect low level loops of the Flight Control system (FC) 112, like pitch and roll angles. For example, there may exist a Gimbal behavior policy, which imposes some limitations on the pitch and roll angles and/or the course of the air vehicle 10, so that the air vehicle's own fuselage does not interrupt the line-of-sight that connects the air vehicle's sensors (e.g. a camera) with the moving target 11.

As illustrated in the example of FIG. 2, two boundaries 12, 13 surrounding the position of the moving target 11 are established; as the moving target 11 moves, the two boundaries 12, 13 are dynamically variable (e.g., the boundaries 12, 13 are dynamically calculated). According to an example of the method, the boundaries 12, 13 are circular. Nevertheless, these boundaries may have any shape (e.g., oval, triangular, polygonal, concave, convex). The boundaries 12, 13, in some examples, have the moving target 11 as their center point. However, in other examples, the moving target 11 may be offset relative to the center point of the boundaries 12, 13.

In some examples, in each iteration of the example method, the tracking problem is solved, for a given altitude, in two dimensions, 2D. In some examples, the altitude depends on each particular behavior policy, which may consider a terrain elevation map, to establish the particular altitude at which the tracking problem is to be solved by the tracking algorithm 104 in each iteration.

In some examples, the first boundary 13 establishes a minimum desired distance of the air vehicle 10 with respect to the moving target 11 so that the air vehicle 10 remains undetected. In some examples, the second boundary 12 establishes a maximum desired distance of the air vehicle 10 with respect to the moving target 11 so that the air vehicle 10 does not lose sensor detection contact with the moving target 11.

In some examples, the first boundary 13 is established taking into consideration the detectability of the air vehicle 10 by the moving target 11. According to a possible behavior policy, in some examples, the detectability is considered in terms of the possibility that the air vehicle 10 remains invisible by the moving target 11. For this purpose, in some examples, it is considered that the air vehicle 10 keeps out of sight from the moving target 11 (e.g., a threshold distance, a threshold height, a threshold distance to deter operating noises from the aircraft 10 from being heard by the moving target 11, etc.). According to another example behavior policy, the detectability of the air vehicle 10 is considered in terms of the possibility that the air vehicle 10 remaining unheard by the moving target 11. For this purpose, the noise footprint of the air vehicle 10 may be considered, so that, as said before, the air vehicle 10 remains unheard by the moving target 11 during the tracking mission.

According to an example of the method, another example behavior policy is used to establish the second boundary 12. In some examples, the second boundary 12 may be established by taking into consideration that the sensors of the air vehicle 10 do not lose contact (e.g., sensor detection contact) with the moving target 11, e.g., line of sight and/or capability of radar detection of the moving target 11 is ensured/substantially ensured during the whole tracking mission.

In any case, in some examples, the particular behavior policy 102 is to indicate the criteria with which the first boundary 13 and the second boundary 12 are established. According to an example of the method, the air vehicle 10 is instructed to fly at a threshold distance from the moving target 11, said distance constituting a threshold and/or example location profile and/or area 14 (e.g., which, as shown in the figures, may be a circle) located between the first boundary 13 and the second boundary 12. The air vehicle 10 is instructed to track the moving target 11, for example, from behind the moving target 11, in an example position (O) located at the threshold location profile and/or area 14. As shown in the example of FIG. 2, the example position (O) of the air vehicle 10 (e.g., when the dynamic circumstances of the moving target 11 and the air vehicle 10 allow so) is a position behind the moving target 11, at a determinate altitude. Nevertheless, in some examples, an alternative behavior policy for tracking moving targets 11 may instruct the air vehicle 10 to track the moving target 11 from positions other than those behind the moving target 11.

Despite using circles as examples of the first boundary 13, second boundary 12 and threshold distance, in some examples, the boundaries and threshold distance may be any other alternative shape (e.g., polygon, square, etc.), according to alternative behavior policies. In some examples, the alternative shape may be expressed in polar coordinates with respect to the position of the moving target 11, such that the shape may be given as a function "r=f(theta)", where "r" is a distance with respect to the moving target 11 and "theta" is an angle established with respect to a certain origin of the polar angular coordinate. However, the shapes and/or the position(s) of the shapes may be expressed in any suitable way.

FIG. 2 shows an example schematic representation of the moving target 11 and the air vehicle 10 (e.g., a fixed-wing air vehicle, as represented in FIG. 2). In the illustrated example, the first boundary 13, the second boundary 12 and the threshold location profile and/or area 14 are represented by the projections on the ground level of the first boundary 13, the second boundary 12 and the threshold and/or example location profile and/or area 14 on a horizontal plane, located at the actual altitude of the air vehicle 10. In the illustrated example, the relative altitude (H) of the air vehicle 10 with respect to the moving target 11 is also represented in FIG. 2.

As shown in the example of FIG. 2, the term "$R_{min}$" represents the radius of the first boundary 13; the term "$R_{max}$" represents the radius of the second boundary 12; the term "$R_{opt}$" represents the radius of the threshold and/or example location profile and/or area 14; the term "O" represents the reference and/or example position. According to an example of the method presented herein, the reference and/or example position (O) is generated as an example reference for the air vehicle 10.

As already introduced, in some examples, there may be certain circumstances that hinder the air vehicle 10 from following the moving target 11 at a position behind the moving target 11. For example, if the moving target 11 is moving too slow, and the air vehicle 10 minimum groundspeed is higher than the actual speed of the moving target 11, the air vehicle 10 may not be able to reliably perform its tracking mission by following the moving target 11 from a position directly behind the moving target 11 without risking trespassing the first boundary 13 (e.g., if the air vehicle 10 passes the first boundary 13, the air vehicle 10 may be viewable by the moving target 11 ).

Because this risk is unacceptable for most tracking missions (e.g., the risk of being detected by the moving target 11 ), the example method comprises in those examples (e.g., according to a particular behavior policy) generating two alternating references according to two alternating positions, represented as "O1" and "O2" in the example of FIG. 2, and instructs the air vehicle 10 to alternately fly towards either one of these two positions (O1, O2) as long as the moving target 11 keeps moving at a speed lower than the minimum groundspeed of the air vehicle 10, under actual wind conditions. In other words, in examples in which the moving target 11 is moving at a rate that is less than a threshold and/or minimum speed of the air vehicle 10, the examples disclosed herein develop alternate routes for the air vehicle 10 that enable the air vehicle 10 to follow the moving target in a non-direct route (e.g., not directly behind the moving target 11 ) flying side to side in a direction generally behind the moving target 11.

In the illustrated example, the alternating positions (O1, O2) are located behind the moving target 11 ; the vertical planes comprising the alternating positions (O1, O2) and the moving target 11 are separated by an angle "α" (as represented in FIG. 2) at each side from the vertical plane comprising the reference and/or example position (O) and the moving target 11. In some examples, the angle "α" between O and O2 (e.g., thirty degrees) is different than the angle "α" between O and O1 (e.g., forty five degrees).

In some examples, there may be also certain circumstances in which the actual speed of the moving target 11 is higher than the air vehicle's maximum groundspeed, under actual wind conditions. In such examples if this circumstance lasts for too long, the air vehicle 10 may end up losing sensor detection contact with the moving target 11. If the moving target 11 is traveling at a rate that is faster than the air vehicle 10, an estimated trajectory of the moving target 11 may be established and the air vehicle 10 may be directed to fly along the estimated trajectory.

The example method comprises generating a first reference comprising the coordinates of the reference and/or example position (O), and instructing the air vehicle 10 to fly towards the first reference.

In some examples, because it is assumed that a reliable estimation of the motion of the moving target 11 is available by the air vehicle's sensors, if it is assessed (e.g., by means of a microcontroller unit either located onboard the air vehicle 10 or at a Control Station) at any time during the tracking mission, that the moving target's 11 actual speed is lower than the air vehicle's 10 minimum groundspeed, under actual wind conditions, the example method comprises generating at least two alternate references comprising the coordinates of either two alternate positions (O1, O2), for example, located behind the moving target 11, at the reference and/or example distance constituting the threshold and/or example location profile and/or area 14 surrounding the moving target 11.

The example method presented herein enables the tracking mission to be carried out efficiently; in this sense, the whole flight envelope of the air vehicle 10 is used for the purpose of the mission to widen the different conditions (e.g., to increment the number of possible locations for the air vehicle 10) in which the method succeeds to provide a valid solution (e.g., an acceptable air vehicle's location from which to reliably follow and track the moving target 11 ). In some examples, it is in the process of translation of the reference location of the air vehicle 10 (e.g., relative to the moving target 11 ) into a guidance reference for the FC system 112 where the limitations provided by the Aircraft Performance Model (APM) 108 play their role, to enable the air vehicle 10 not to be flown into its operational limits (e.g., maximum speed, minimum speed, etc.).

In some examples, using the whole flight envelope of the air vehicle 10 means that: 1) the tracking algorithm 104 considers the speed of the air vehicle 10, and also dynamically modifies it to substantially enable the mission to be carried out in an efficient manner (e.g., a relatively efficient manner, the most efficient manner), meaning that the air vehicle 10 can fly as slow as it is able to, if desired (e.g. the moving target 11 is moving very slow), or either that the air vehicle 10 can fly at faster speeds, and also proportional to how far the air vehicle 10 is from the reference location, and; 2) the air vehicle performance's limitations are considered to enable the algorithm not to violate the air vehicle's operational limits, putting the integrity of the air vehicle 10 at risk. In some examples, the operating limits of the air vehicle 10 include the minimum and/or maximum speeds and/or maneuverability of the air vehicle 10.

According to what has been mentioned above, in some examples, a particular behavior policy 102 may include that the guidance algorithm modifies the air vehicle's 10 altitude, thus instructing the air vehicle 10 to vary its altitude if there is an object/landmark/topography (e.g., a mountain, a hill, a wall, etc.) that may interrupt the line-of-sight between the air vehicle 10 and the moving target 11.

The following is a more detailed description of the architecture components depicted in FIG. 1, according to an example.

The Moving Target State Estimator Module 106 is an external component that is responsible for the estimation of the motion (position and velocity) of the moving target 11 (for example, a GMT). In some examples, it is assumed that the Moving Target State Estimator Module 106 component exists and provides such information accurately, and may be supported in computer vision and sensor data fusion and filtering algorithms. In some examples, the Moving Target States Estimator Module 106 component provides the Tracking Infrastructure Module 100 with data on the position and velocity of the moving target 11.

The Navigation System Module 110 is also an external component that is responsible for estimating the state vector of the air vehicle 10, for example, a UAV position, velocity, altitude and their derivatives over time. This estimation may be carried out by means of some fusion and filtering algorithms (e.g., EKF approaches, Extended Kalman Filter approaches, etc.) applied to data coming typically from onboard sensors (GNSS, accelerometers, gyroscopes, magnetometers, pressure sensors, etc.).

However, the estimation may be performed in any suitable manner. In some examples, the navigation state component provides the Tracking Infrastructure Module 100 with the air vehicle's 10 state vector.

In some examples, the Flight Control System Module 112 is an external component that issues the appropriate signals to the air vehicle's 10 actuators to follow the guidance references that define the mission of the air vehicle 10. The guidance references are, for example, generated in the Tracking Infrastructure Module 100, therefore resulting in a fully autonomous system with no need of human intervention. The guidance references are, for example, defined by target altitude, course and airspeed.

In some examples, the Aircraft Performance Model Module 108 is an external component comprising the movement characterization and maneuverability characterization of each particular air vehicle 10. It also may define limitations (e.g., in airspeeds, altitudes, altitude angles, mass, etc.) and operational limits of the air vehicle 10.

In some examples, the Air Vehicle Behavior Policies Module 102 includes a group of limitations and/or constraints associated with the behavior of the air vehicle 10 (e.g., a UAV) that affect the particular manner in which the moving target 11 (e.g., a GMT) is to be tracked, that is, how the GMT Tracking problem is to be stated. In particular, in some examples, the problem may involve the following parameters: vertical distance, H, between the air vehicle 10 and the moving target 11, detectability distance and/or shape of the detectability area, optimum distance and maximum distance of the air vehicle 10 with respect to the moving target 11. The following policies have been identified to cover a wide range of examples.

Noise footprint policy: an example of the implementation of this policy may involve defining the detectability threshold of the air vehicle 10, being defined as the minimum distance at which the air vehicle 10 is detectable by a moving target 11 based on its noise footprint (e.g., the ability of those within the moving target 11 to hear noise generated by the air vehicle 10). To apply such policy, in some examples, a noise map is defined which is responsible for this policy. Regarding the statement of the moving target tracking problem stated in the Tracking Infrastructure Module 100, this policy provides constraints on the altitude of the air vehicle 10 with respect to the moving target 11, the detectability distance as well as in the aperture angle alpha considered in the examples where the moving target 11 is moving slower than the capability of the air vehicle 10. Alternatively, the detectability threshold may be formed using another shape, rather than a circle determined by the detectability distance.

Visual Identification Policy: an example of the implementation of this policy may involve defining the detectability threshold of the air vehicle 10 being defined as the minimum distance at which the air vehicle 10 is visually detectable by the moving target 11. Similar to the previous policy, in regard to the statement of the moving target tracking problem, in some examples, this policy provides constraints on the altitude of the air vehicle 10 with respect to the moving target 11, the detectability distance as well as in the aperture angle alpha considered in the examples where the moving target 11 is moving slower than the capability of the air vehicle 10.

Obstacle/Terrain elevation policy: an example of the implementation of this policy may involve defining altitude constraints in the statement of the moving target tracking problem that have to be fulfilled by the air vehicle 10 to keep line-of-sight with the moving target 11.

Gimbal-sensor policy: an example of the implementation of this policy may involve defining limitations on the maximum distance relative to the moving target 11 (e.g., at farther distances, the sensors of the air vehicle 10 may not be able to detect the moving target 11 with a threshold of accuracy) and also limitations regarding the altitude of the air vehicle 10 so that direct line-of-sight between the sensor (e.g., a camera, for example) and the moving target 11 is enabled. In this sense, in some examples, limits of the pan and tilt angles of the gimbal are taken into account to enable such limits to not be violated to keep line-of-sight contact between the sensor and the moving target 11. In some examples, this policy also addresses the issue of the so-called occlusion map so that the air vehicle 10 frame does not blind the sensor at any particular altitude.

Others: in some examples, particular policy-based architectures that are flexible enough to accommodate other user policies and/or guidelines that affect the particular statement of the moving target tracking problem.

According to an example of the method of tracking a moving target 11 from an air vehicle 10, the Tracking Algorithm Module 104 makes a set of assumptions in the statement of the moving target tracking problem:

In some examples, the altitude of the air vehicle 10 is a constant value during the resolution of the problem, and the altitude is normally the actual altitude of the air vehicle 10. Nevertheless, in some examples, a particular policy may define a desired altitude that may be provided as a guidance reference to the flight control system. As mentioned above, between consecutive computations of the tracking algorithm 104, the reference location for the air vehicle 10 may change, and so the altitude provided by a particular policy may also change.

In some examples, there are three different areas, comprising any generic shape, which define a detectability zone, a threshold and/or example location and a non-detection zone for the air vehicle 10 to track the moving target 11; as already introduced above, according to an example of the method (according to an example for this policy), these three areas are defined by means of the horizontal distance ($R_{min}$, $R_{max}$, $R_{opt}$) between the air vehicle 10 and the moving target 11, such distances also defined by the air vehicle 10 behavior policies.

As has already been said, in some examples, a threshold and/or example location for the air vehicle 10 from which to track the moving target 11 is, according to an example of the method (according to an example for this policy), a position directly behind the moving target 11 at $R_{opt}$ distance. In case this is not possible for speed restrictions or for any other reason, the air vehicle 10 swings around the moving target 11 at a distance $R_{opt}$ back and forth along a sector of aperture alpha, for example. In other words, the air vehicle 10 may follow the circumference defined by the area 14 to maintain within the minimum and maximum distances from the moving target 11 (e.g., the band defined between the minimum and maximum distances).

In some examples, the air vehicle 10 avoids the detectability zone (avoids getting inside area of $R_{min}$) over all restrictions.

In some examples, the position and speed of the moving target 11 are known.

In some examples, the wind speed and direction local to the air vehicle 10 position are also known.

With these assumptions in mind, in some examples, the GMT Tracking problem has three different scenarios, as also introduced above in this description:

Problem case 1 example : In some examples, the moving target 11 is moving within the groundspeed limits of the air vehicle 10. In this example, as mentioned in the assumptions (and also according to a possible behavior policy), the air vehicle 10 stays directly behind the moving target 11. Other behavior policies on which the tracking algorithm 104 may be based, could indicate for example, as has already been said, that when the moving target 11 is moving within the groundspeed limits of the air vehicle 10, the air vehicle 10 varies its position relative to the moving target 11 for taking several images of the moving target 11 from different perspectives for better identifying the moving target 11.

Problem case 2 example: In some examples, the moving target 11 is moving faster than the fastest groundspeed of the air vehicle 10. In this case, it may be unavoidable that the distance between the air vehicle 10 and the moving target 11 increases over time until the moving target 11 is eventually lost (e.g., no longer trackable by the air vehicle 10 ). In some examples, to delay such event as much as possible, the example course of action in this case is to keep the air vehicle 10 at its maximum groundspeed in the same direction as the moving target 11 is moving. In other words, if the moving target 11 is moving faster than a maximum speed of the air vehicle 10, the trajectory of the air vehicle 10 may be set to be an estimated trajectory of the moving target 11 and the speed of the air vehicle 10 may be set at a threshold speed (e.g., a maximum speed of the air vehicle 10).

Problem case 3 example: In some examples, the moving target 11 is moving slower than the minimum groundspeed of the air vehicle 10. According to a possible behavior policy, in some examples, the air vehicle 10 flies at its minimum groundspeed, moving back and forth between alternating positions (O1, O2) at a threshold distance $R_{opt}$. In other words, if the moving target 11 is moving slower than the minimum speed of the air vehicle 10, the trajectory of the air vehicle 10 may be varied to fly between O1 and O2 while keeping a threshold distance between the air vehicle 10 and the moving target 11 to reduce or prevent detectability of the air vehicle 10 by the moving target 11. In some examples, other behavior policies could indicate that instead of moving at a threshold distance from the moving target 11, the air vehicle 10 moves around the moving target 11 without trespassing a contour surrounding the moving target 11 e.g., the first boundary 13), the contour having any predetermined shape established by each particular behavior policy.

Figure 3:
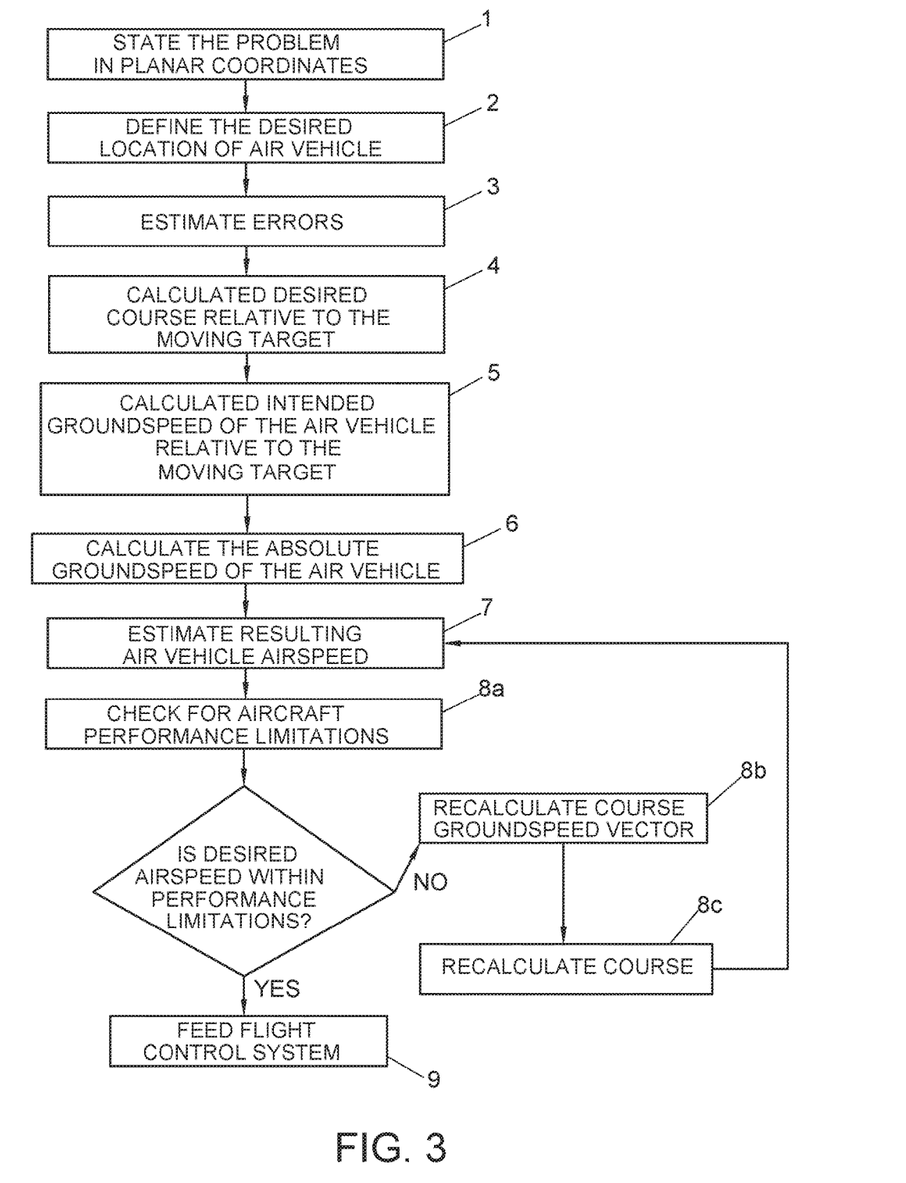
FIG. 3 shows a flowchart depicting an example method of tracking a moving target.

The following is a description of an example of the tracking algorithm 104, performing the method of the present disclosure. The blocks of the tracking algorithm 104 are schematically depicted in FIG. 3. When describing the processes of the algorithm, reference is to be made hereinafter to FIGS. 4, 5 and 6.

Figure 4:
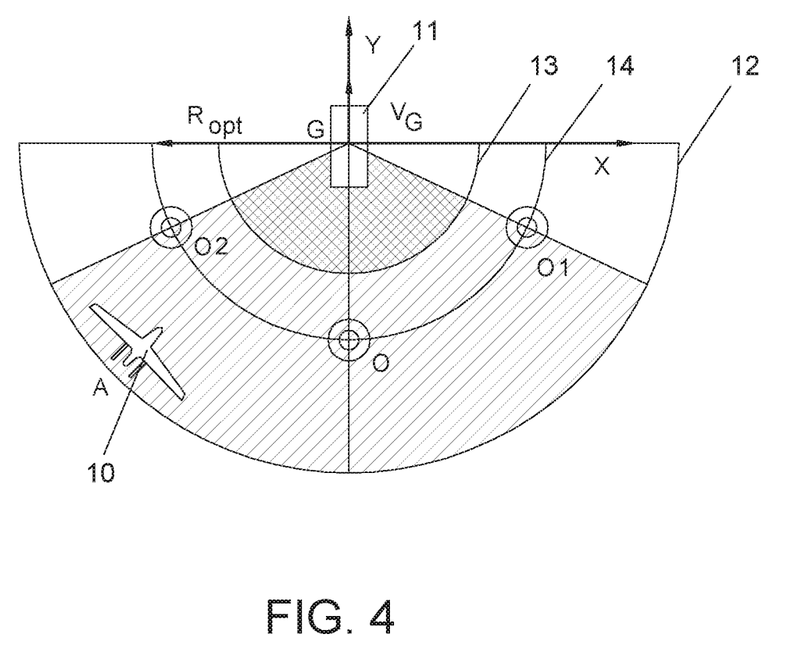
FIG. 4 shows a schematic diagram representing the positions of the air vehicle and the moving target, at block 2 of the example flowchart shown in FIG. 3.
Figure 5:
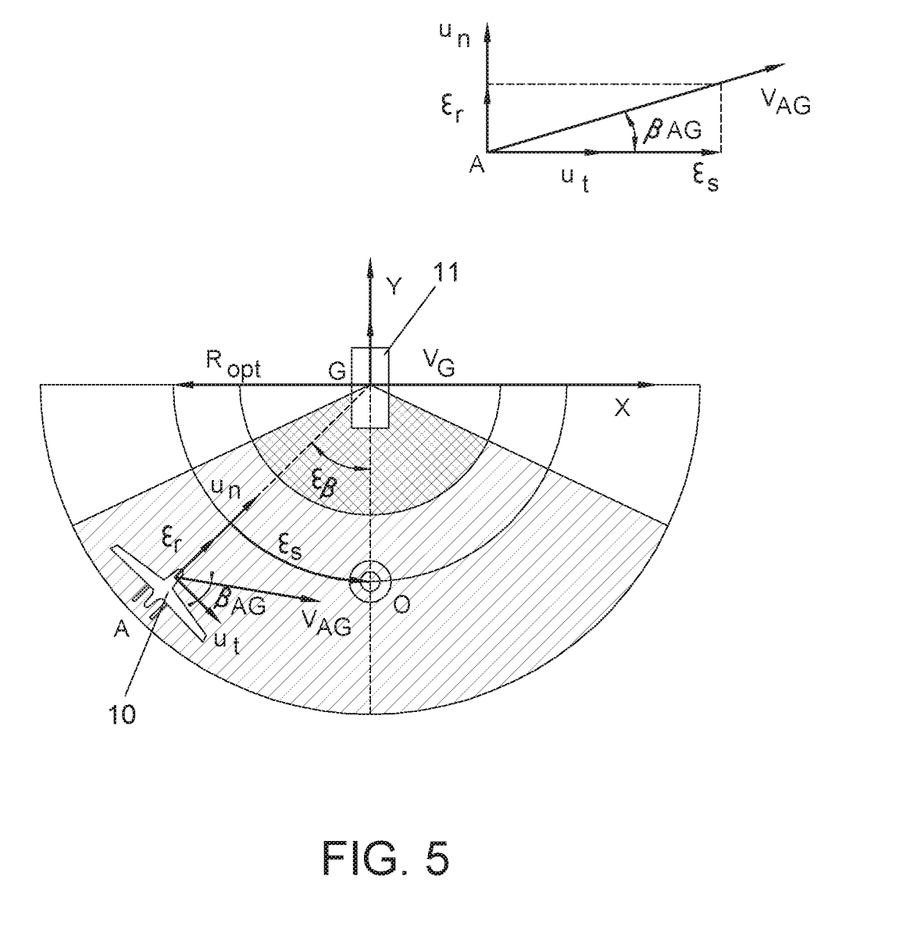
FIG. 5 shows a schematic diagram representing the positions, course and cinematic vectors concerning blocks 3 to 5 of the example flowchart shown in FIG. 3.
Figure 6:
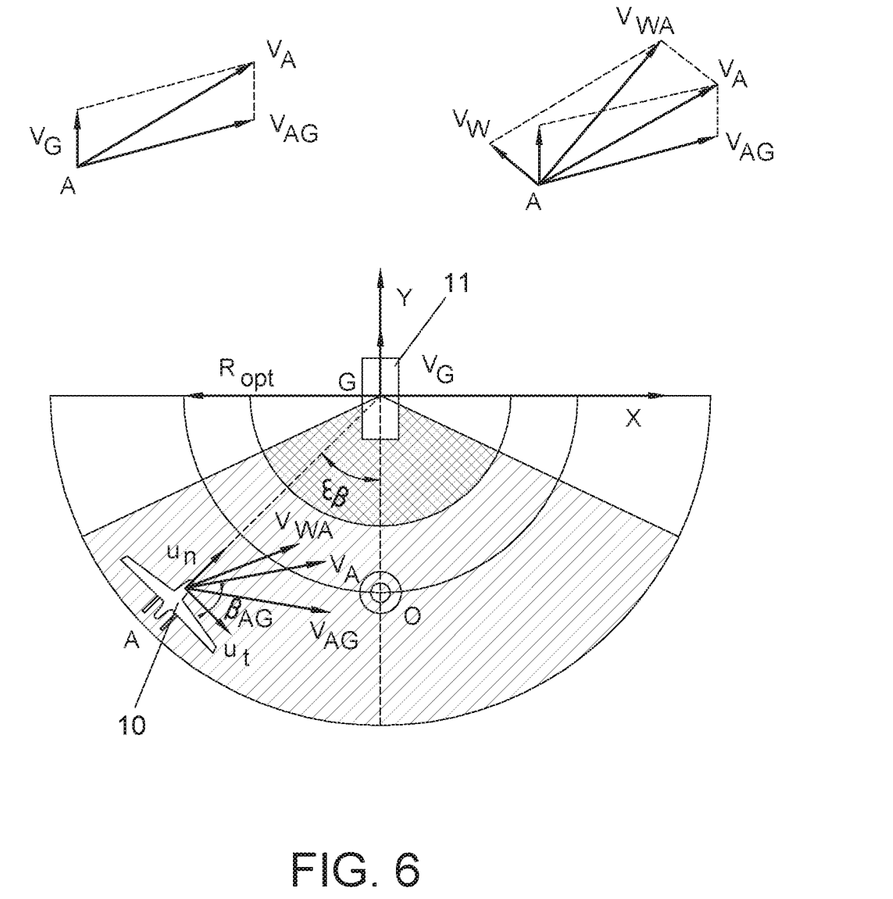
FIG. 6 shows a schematic diagram representing the positions and cinematic vectors concerning blocks 6 and 7 of the example flowchart shown in FIG. 3.

In some examples, the tracking algorithm 104 generates guidance references to track the moving target 11 (e.g., a GMT) is based in stating the problem of the relative motion of the air vehicle 10 (point A in FIGS. 4, 5 and 6), which has been represented as a fixed-wing air vehicle 10 by way of example, with respect to the moving target 11 (point G in FIGS. 4, 5 and 6). In some examples, the tracking algorithm 104 calculates the relative speed vector of A (e.g., the location of the air vehicle 10) with respect to G (e.g., the location of the moving target 11).

The particular example algorithm shown in FIG. 3 is made up of 9 processes. According to example illustrated in FIG. 3, the algorithm performing the method comprises:

In this example, the method begins with stating the problem in planar coordinates and/or projecting into planar coordinates both the coordinates of the air vehicle 10 and the coordinates of the moving target 11 block 1). The projection may be orthomorphic (conformal) to preserve angles. In this example, the problem is then stated in the Cartesian reference system defined by:

Setting the coordinates origin in the actual location of the moving target 11 ;

Establishing the Y coordinated axis in the direction of motion of the moving target 11 ;

Establishing the X coordinated axis so that the resulting coordinates' system is right-handed oriented.

In this example, the method defines a desired location and/or defines a reference location of the air vehicle 10 which, according to the different contemplated scenarios mentioned above, may either be:

Position O in problem case 1;

The actual position of the air vehicle in problem case 2;

Either Position O position O1 or position O2 in problem case 3 (block 2).

For the sake of a clear representation, in this example, FIGS. 5 and 6 represent the problem case 1, e.g., the intended air vehicle's location is defined by position O.

In this example, the method estimates errors (or divergences) with respect to the reference location of the air vehicle 10 defined in the previous process (block 3). Two different errors are defined and represented in FIG. 5:

Radial Error: $\varepsilon_r = R_{opt} - |GA|$.         Equation 1

In this example, Equation 1 represents how far the air vehicle 10 is from the reference location, in the normal direction, wherein for the purposes of the radial error, the reference location is given by its distance to the moving target 11, $R_{opt}$ (the radial distance among the moving target 11 and the reference location).

Tangential Error: $\varepsilon_s = \varepsilon_\theta * R_{opt}$, where $\varepsilon_\theta = \theta_A - \Theta_o$.      Equation 2

In this example, the tangential error defined by equation 2 represents how far the air vehicle 10 is from the reference location in the tangential direction.

In this example, the method calculates the desired course relative to the moving target 11 and/or calculates 4 the desired direction of the relative motion of the air vehicle 10 with respect to the moving target 11 (block 4). In some examples, the computed errors are expressed in an n-t (normal-tangential) reference system centered in the air vehicle 10 (Reference system A, $u_n$, $u_t$), the direction of the relative speed vector of the air vehicle 10 with respect to the moving target 11 is defined by the Equation 3 (see FIG. 5):

$$\beta_{AG} = \operatorname{atan}\frac{\varepsilon_r}{\varepsilon_s} \qquad \text{Equation 3}$$

In some examples, even though the air vehicle 10 may be placed at a distance R $_{opt}$, if the air vehicle 10 is in front of the moving target 11 (instead of behind the moving target 11), the radial error is null ($\varepsilon r=0$) while the tangential error is very high ($\varepsilon_s=\pi*R_{opt}$); to correct such error, in some examples, the air vehicle 10 moves quickly in the tangential direction, avoiding getting into the detectability zone.

In this example, the method calculates the intended ground speed of the air vehicle 10 relative to the moving target 11 and/or calculates 5 the magnitude of the relative speed vector of the air vehicle 10 with respect to the moving target 11 (block 5).

In some examples, a proportional (proportional to the errors calculated) response of the air vehicle 10 may eventually be desired, so that, if the air vehicle 10 is far from the reference location (in either the radial direction, the tangential direction or both) the air vehicle 10 reacts faster than in the case the air vehicle 10 is closer to the reference location (in which case, in some examples, the desired relative speed is minimized to optimize the block). In some examples, a proportional response behavior fits very well in a PID approach from classic control theory, for example.

The magnitude of the relative speed vector of the air vehicle 10 with respect to the moving target 11 may be defined by Equation 4:

$$V_{AG} = \left(kp_r*\varepsilon_r + kd_r*\frac{d\varepsilon_r}{dt} + ki_r*\int_{t_0}^{t_1}\varepsilon_r*dt\right) + \left(kp_s*\varepsilon_s + kd_s*\frac{d\varepsilon_s}{dt} + ki_s*\int_{t_0}^{t_1}\varepsilon_s*dt\right) \qquad \text{Equation 4}$$

wherein:
Kp$_r$ and Kp$_s$ are proportional to the radial and tangential errors respectively;
Kd$_r$ and Kd$_s$ are proportional to the variation over time of the radial and tangential errors respectively;
Ki$_r$ and Ki$_s$ are proportional to the integration during a particular time interval of the radial and tangential errors respectively.

In some examples, even though the magnitude of the relative speed vector of the air vehicle 10 with respect to the moving target 11 has been defined by means of full PID's, it is up to the user to fully characterize them (e.g., the magnitude of the relative speed vector of the air vehicle 10); for example, a fully proportional response may be given by 2 parameters (Kp$_r$ and Kp$_s$).

In some examples, the magnitude of the relative speed vector of the air vehicle 10 with respect to the moving target 11 may be calculated according to any existing control theory (e.g., other than a PID-based control theory, a proportional integral derivative controller) which combine one or more of the estimated errors.

In this example, the method calculates the absolute groundspeed, V$_A$, of the air vehicle 10 (block 6). The absolute groundspeed of the air vehicle 10 can be determined and/or achieved by vector algebra, as the groundspeed of the moving target 11 is assumed to be known. Vector V$_A$ may be obtained from Equation 5:

$$\vec{V_A} = \vec{V_{AG}} + \vec{V_G} \qquad \text{Equation 5:}$$

wherein:
V$_A$ is the absolute groundspeed of the air vehicle 10;
V$_{AG}$ is the relative speed of the air vehicle 10 with respect to the moving target 11;
V$_G$ is the groundspeed of the moving target 11.

In this example, the method estimates and/or calculates, the airspeed of the air vehicle 10 (block 7). In some examples, so far all speed magnitudes involved in the problem are groundspeed, which may not be a common magnitude used in aviation (as all vehicle performances and limitations depend rather on airspeed). Therefore, the resulting airspeed may be calculated, again with vector algebra, taking into account the local wind conditions. Equation 6 may be used to determine the resulting airspeed:

$$\vec{V_{WA}} = \vec{V_W} + \vec{V_A} \qquad \text{Equation 6}$$

wherein:
V$_{WA}$ is the airspeed of the air vehicle 10;
V$_W$ is the wind vector at the air vehicle's position;
V$_A$ is the absolute groundspeed vector of the air vehicle 10, calculated in the previous block.

In this example, the method checks performance limitations of the air vehicle 10 and/or checks performance limitations (block 8a).

In some examples, if the airspeed previously calculated falls below the stall speed or above the maximum airspeed values (e.g., these values are taken with a predetermined and/or threshold tolerance range, to compensate a possible uncertainty in wind estimation, so as to deter the air vehicle 10 accidentally reaching its stall speed and/or maximum airspeed limits) of the air vehicle 10 (e.g., depending on the particular local wind field as well as the aforementioned PID parameters). For example, if the desired and/or threshold airspeed of the air vehicle 10 is outside of the operating speeds (e.g., a maximum speed, a minimum speed,) and/or outside of other operating thresholds of the air vehicle 10, then the airspeed may be adjusted to such values (e.g., adjust the desired air speed to be within the operating capabilities of the air vehicle 10). In the illustrated example, adjusting the airspeed values involving recalculating the groundspeed vector of the air vehicle 10 (block 8b), recalculating course (block 8c), so that the groundspeed vector points towards the reference location, and returning to (block 7), and iterating the block until a valid solution is found.

In this example, the method feeds the flight control system and/or provides a guidance reference to the air vehicle 10 (block 9). In some examples, these guidance references may include at least three types of references or magnitudes that may be provided to the air vehicle 10 Flight Control System (FC) 112. These references, which may define how the air vehicle 10 is to be operated, are based on common magnitudes used in Flight Control Systems as guidance references:

In some examples, a desired and/or threshold course (given by the direction of the absolute groundspeed vector of the air vehicle 10) may be provided according to any combination of parameters (e.g., heading or bearing in either magnetic or true flavors may be provided; also the absolute coordinates of the reference location may be provided, bearing in mind that the reference location is continuously recalculated in each iteration of the method, as the moving target 11 and/or the air vehicle 10 keep moving);

A desired airspeed (e.g., given by the module of the airspeed of the air vehicle 10, or any derivative magnitude);

A desired altitude, taking into account the air vehicle 10 behavior policies.

In some examples, the guidance references are provided to the FC system 112, with respect to the moving target's state vector (estimated position, speed, etc.). Although the guidance reference may include a desired course (e.g., it may not specify a desired location, but a desired course), in some examples, a reference location of the air vehicle 10 with respect to the moving target's 11 estimated location is calculated first, to generate a guidance reference as a desired course pointing to that calculated reference location.

In some examples, the guidance references are continuously re-calculated and given to the FC system 112 of the air vehicle 10 so that the air vehicle 10 dynamically adapts its motion to the tracking mission requirements (e.g., to the moving target's 11 state vector).

In some examples, there are also some limitations to be provided to the Flight Control System 112; such is the case of those provided by the Gimbal-sensor policy that define an altitude limitations map (e.g., pairs of pitch/roll limits) that have to be taken into account by the Flight Control System 112 to enable the particular sensor to be in the line-of-sight with the moving target 11, e.g., that the air vehicle's fuselage does not interrupt the line-of-sight connecting each sensor with the moving target 11.

Further, examples of the methods disclosed may include a computer programmed to operate in accordance with the method described herein. The computer may be associated with a conventional flight simulator. In turn, the computer may include a processor and a memory for a computer program that, when executed, causes the processor to operate in accordance with the method described herein. The computer program may also be embodied in a computer readable medium having stored therein the computer program.

In some examples, to solve the inconveniences and address the issues mentioned above, an example method of tracking a moving target from an air vehicle 10 is presented herewith.

The example method of tracking a moving target from an air vehicle 10 includes determining an estimated location and speed of at least one moving target and instructing an air vehicle 10 to follow the moving target.

The example method of tracking a moving target from an air vehicle 10 includes: determining a detectability zone surrounding the moving target; calculating at least one reference location for the air vehicle 10, wherein the reference location is a location relative to the estimated location and/or speed of the moving target, wherein the reference location is placed out of the detectability zone; generating at least one guidance reference to command the air vehicle 10 for tracking the moving target, wherein the guidance reference comprises at least a desired course to fly towards the calculated reference location; a desired speed to fly towards the calculated reference location; a desired flying altitude, and; instructing the air vehicle to fly according to the generated guidance reference.

In some examples, the determination of the detectability zone, the calculation of a reference location and the generation of at least one guidance reference are performed according to at least one predetermined behavior policy of the air vehicle.

According to an example of the method, the desired speed is calculated based on the divergence existing among actual/current location of the air vehicle and the calculated reference location of the air vehicle.

The mentioned divergence existing among the actual location of the air vehicle and the reference location of the air vehicle may be calculated based on any combination of one or more of at least angular deviation existing between a first ground imaginary line which is a projection on a horizontal plane of a first imaginary line which links the moving target with the air vehicle; and a second ground imaginary line which is a projection on the horizontal plane of a second imaginary line which links the moving target with the at least one reference location of the air vehicle, and; radial deviation existing between: a circumference centered in the moving target and passing along a projection in the horizontal plane of the actual location of the air vehicle; and a circumference centered in the moving target and passing along a projection in the horizontal plane of the reference location of the air vehicle.

In some examples, the desired speed at which the air vehicle flies towards the reference location may be calculated according to any combination of one or more of at least proportional, integral and derivative criteria, which mathematically combine any combination of one or more of at least the angular deviation and the radial deviation.

According to an example, the desired speed to fly towards the reference location is calculated based on wind velocity local to the actual location of the air vehicle.

In some examples, a predetermined behavior policy indicates the detectability zone is a circle in a horizontal plane, centered in the moving target. However, the detectability zone may be any shape and the moving target may be positioned in any location within the detectability zone.

Also, according to an example behavior policy, the detectability zone may be based on any combination of one or more of at least probability that the moving target detects sound emitted by the air vehicle, wherein this probability is based on features of the air vehicle, and; probability that the moving target visually detects the air vehicle, wherein this probability is based on features of the air vehicle.

According to an example of the method, a predetermined behavior policy for calculating the reference location is based on placing the reference location among a first boundary, which is a limit for the detectability zone, and a second boundary, which is a limit beyond which the air vehicle is not likely to detect the moving target, wherein this probability is based on features of the air vehicle. In other words, the air vehicle flies between a minimum and maximum threshold distance from the moving target by flying directly behind the moving target or flying side to side (e.g., side to side within a circumferential band and/or zone) within a zone defined by the minimum and maximum threshold distances.

According to an example behavior policy, the first boundary and the second boundary have the shapes of circles in a horizontal plane, the circles centered in the moving target.

Also according to an example behavior policy, the reference location of the air vehicle is placed at an altitude which is adjusted depending on terrain characteristics, so that if an obstacle hinders detection of the mobile target from the air vehicle, the altitude of the reference location is accordingly increased or decreased.

In some examples, the method includes, according to an example thereof, assessing whether the estimated speed of the moving target is greater than a maximum groundspeed (speed with respect to the ground) allowed for the air vehicle, under actual wind conditions (under the wind conditions at the time and location where the air vehicle is currently flying); is less than minimum groundspeed allowed for the air vehicle, under actual wind conditions; or falls between the minimum groundspeed allowed for the air vehicle and the maximum groundspeed allowed for the air vehicle (or is equal to one of these limits), under actual wind conditions.

According to an example of the method, if the speed of the moving target is lower than the minimum groundspeed of the air vehicle, the method includes generating at least: a first guidance reference and a second guidance reference, wherein the first guidance reference includes at least one first reference location for the air vehicle and the second guidance reference includes at least one second reference location for the air vehicle, wherein the first reference location and the second reference location are placed out of the detectability zone, and; instructing the air vehicle to alternately fly toward the first reference location and toward the second reference location, according to the generated first guidance reference and second guidance reference. According to an example of the method, if the speed of the moving target is greater than the maximum groundspeed of the air vehicle, the method includes generating at least one guidance reference comprising at least one reference location for the air vehicle, wherein the reference location is placed out of the detectability zone and wherein the method includes instructing the air vehicle to fly toward the reference location at the maximum groundspeed allowed for the air vehicle, under actual wind conditions.

Lastly, according to an example of the method, if the speed of the moving target is equal to the minimum groundspeed for the air vehicle or falls between the minimum groundspeed allowed for the air vehicle and the maximum groundspeed allowed for the air vehicle, under actual wind conditions, the method includes generating at least one guidance reference comprising at least one reference location for the air vehicle, wherein the reference location for the air vehicle is placed out of the detectability zone and right behind and/or adjacent to the moving target.

The present disclosure also refers to a computer readable medium including instructions for carrying out the method described above.

The present disclosure also refers to an example system for tracking a moving target from an air vehicle, wherein the system includes a Tracking Infrastructure Module which in turn comprises an Air Vehicle Behavior Policies Module and Tracking Algorithm Module 104. The Tracking Algorithm Module 104 is configured to perform the method described above, according to behavior policies stored in the Air Vehicle Behavior Policies Module.

The main challenges that may be addressed in ISR missions are: the estimation of the moving target motion (position, velocity and acceleration) and the actual guidance of the air vehicle.

Provided that a reliable estimation of the moving target motion is available, in some examples, the issues that are addressed when tackling the problem of tracking a moving target from an air vehicle include: minimum detectability by the moving target; avoiding sensor blind spots that could lead the air vehicle to lose visual contact with the moving target to be tracked; managing variable weather conditions; considering both moving target dynamics and air vehicle motion characteristics, and; considering terrain characteristics (obstacles, terrain elevation, etc.). An example method of tracking a moving target (11) from an air vehicle (10) comprising determining an estimated location and speed of at least one moving target (11) and instructing an air vehicle (10) to follow the moving target (11). The example method comprises: determining a detectability zone surrounding the moving target (11); calculating at least one reference location for the air vehicle 10, relative to the estimated location of the moving target (11), wherein the reference location is placed out of the detectability zone; generating at least one guidance reference to command the air vehicle 10 for tracking the moving target (11), wherein the guidance reference comprises any combination of one or more of at least: a desired course to fly towards the calculated reference location; a desired speed to fly towards the calculated reference location; a desired flying altitude, and; instructing the air vehicle (10) to fly according to the generated guidance reference, wherein the determination of the detectability zone, the calculation of a reference location and the generation of at least one guidance reference are performed according to at least one predetermined behavior policy of the air vehicle (10).

In some examples, the desired speed is calculated based on the divergence existing among actual location of the air vehicle (10) and the reference location of the air vehicle (10). In some examples, the divergence existing among the actual location of the air vehicle (10) and the at least one reference location of the air vehicle (10) is calculated based on any combination of one or more of at least: angular deviation existing between: a first ground imaginary line which is a projection on a horizontal plane of a first imaginary line which links the moving target (11) with the air vehicle (10); and a second ground imaginary line which is a projection on the horizontal plane of a second imaginary line which links the moving target (11) with the at least one reference location of the air vehicle (10), and; radial deviation existing between: a circumference centered in the moving target (11) and passing along a projection in the horizontal plane of the actual location of the air vehicle (10); and a circumference centered in the moving target (11) and passing along a projection in the horizontal plane of the at least one reference location of the air vehicle (10).

In some examples, the desired speed at which the air vehicle (10) flies towards the at least one reference location is calculated according to any combination of one or more of at least proportional, integral and derivative criteria, which mathematically combine any combination of one or more of at least the angular deviation and the radial deviation. In some examples, the desired speed to fly towards the reference location is calculated based on wind velocity local to the actual location of the air vehicle (10). In some examples, according to a predetermined behavior policy, the detectability zone is a circle in a horizontal plane, centered in the moving target (11). In some examples, a predetermined behavior policy for determining the detectability zone is based on any combination of one or more of at least: probability that the moving target (11) detects sound emitted by the air vehicle (10), wherein this probability is based on features of the air vehicle (10), and; probability that the moving target (11) visually detects the air vehicle (10), wherein this probability is based on features of the air vehicle (10).

In some examples, a predetermined behavior policy for calculating the reference location is based on placing the reference location among a first boundary (13), which is a limit for the detectability zone, and a second boundary (12), which is a limit beyond which the air vehicle (10) is not likely to detect the moving target (11), wherein this probability is based on features of the air vehicle (10). In some examples, according to a predetermined behavior policy, the first boundary (13) and the second boundary (12) have the shapes of circumferences in a horizontal plane, the circumferences centered in the moving target (11). In some examples, according to a predetermined behavior policy, the reference location of the air vehicle (10) is placed at an altitude which is adjusted depending on terrain characteristics, so that if there comes up an obstacle which hinders detection of the mobile target (11) from the air vehicle (10), the altitude of the reference location is accordingly raised or lowered.

In some examples, assessing whether the estimated speed of the moving target (11): is higher than maximum groundspeed allowed for the air vehicle (10), under actual wind conditions; is lower than minimum groundspeed allowed for the air vehicle (10), under actual wind conditions; or is equal or falls between the minimum groundspeed allowed for the air vehicle (10) and the maximum groundspeed allowed for the air vehicle (10), under actual wind conditions. In some examples, if the speed of the moving target (11) is lower than the minimum groundspeed of the air vehicle (10), under actual wind conditions, the method comprises: generating at least: a first guidance reference and a second guidance reference, wherein the first guidance reference comprises at least one first reference location for the air vehicle (10) and the second guidance reference comprises at least one second reference location for the air vehicle (10), wherein the first reference location and the second reference location are placed out of the detectability zone, and; instructing the air vehicle (10) to alternately fly towards the at least one first reference location and towards the at least one second reference location, according to the generated first guidance reference and second guidance reference.

In some examples, if the speed of the moving target (11) is higher than the maximum groundspeed of the air vehicle (10), under actual wind conditions, the method comprises generating at least one guidance reference comprising at least one reference location for the air vehicle (10), wherein the reference location is placed out of the detectability zone and wherein the method comprises instructing the air vehicle (10) to fly towards the reference location at the maximum groundspeed allowed for the air vehicle (10), under actual wind conditions. In some examples, if the speed of the moving target (11) is equal or falls between the minimum groundspeed allowed for the air vehicle (10) and the maximum groundspeed allowed for the air vehicle (10), under actual wind conditions, the method comprises generating at least one guidance reference comprising at least one reference location for the air vehicle (10), wherein the reference location for the air vehicle is placed out of the detectability zone and right behind the moving target (11).

An example system for tracking a moving target (11) from an air vehicle (10) includes a Tracking Infrastructure Module (100) which in turn comprises an Air Vehicle Behavior Policies Module (102) and Tracking Algorithm Module (104), wherein the Tracking Algorithm Module (104) is configured to perform the method, according to behavior policies stored in the Air Vehicle Behavior Policies Module (102).

An example computer readable medium for tracking a moving target from an air vehicle, the computer-readable storage medium being non-transitory and having computer-readable program code portions stored therein that in response to execution by a processor, cause an apparatus to at least: determine a detectability zone surrounding the moving target; calculate at least one reference location for the air vehicle, relative to the estimated location of the moving target, wherein the reference location is placed out of the detectability zone; generate at least one guidance reference to command the air vehicle for tracking the moving target, wherein the guidance reference comprises any combination of one or more of at least: a desired course to fly towards the calculated reference location; a desired speed to fly towards the calculated reference location; a desired flying altitude, and; instruct the air vehicle to fly according to the generated guidance reference wherein the determination of the detectability zone, the calculation of a reference location and the generation of at least one guidance reference are performed according to at least one predetermined behavior policy of the air vehicle.

In some examples, the desired speed is calculated based on the divergence existing among actual location of the air vehicle and the reference location of the air vehicle. In some examples, the divergence existing between the actual location of the air vehicle and the at least one reference location of the air vehicle is calculated based on at least one of: angular deviation existing between: a first ground imaginary line which is a projection on a horizontal plane of a first imaginary line which links the moving target with the air vehicle; a second ground imaginary line which is a projection on the horizontal plane of a second imaginary line which links the moving target with the at least one reference location of the air vehicle; radial deviation existing between: a circumference centered in the moving target and passing along a projection in the horizontal plane of the actual location of the air vehicle; or a circumference centered in the moving target and passing along a projection in the horizontal plane of the at least one reference location of the air vehicle.

In some examples, the desired speed at which the air vehicle flies towards the at least one reference location is calculated according to any combination of one or more of at least proportional, integral and derivative criteria, which mathematically combine any combination of one or more of at least the angular deviation and the radial deviation. In some examples, the desired speed to fly towards the reference location is calculated based on wind velocity local to the actual location of the air vehicle. In some examples, a predetermined behavior policy for determining the detectability zone is based on any combination of one or more of at least one of the moving target detects sound emitted by the air vehicle, wherein this probability is based on features of the air vehicle, and; probability that the moving target visually detects the air vehicle, wherein this probability is based on features of the air vehicle.

An example system for tracking a moving target from an air vehicle wherein the system comprises a Tracking Infrastructure Module which in turn comprises an Air Vehicle Behavior Policies Module and Tracking Algorithm Module, wherein the system comprising: a processor and a memory storing executable instructions that, in response to execution by the processor, cause the Tracking Algorithm Module to at least: determine a detectability zone surrounding the moving target; calculate at least one reference location for the air vehicle, relative to the estimated location of the moving target, wherein the reference location is placed out of the detectability zone; generate at least one guidance reference to command the air vehicle for tracking the moving target, wherein the guidance reference comprises any combination of one or more of at least: a desired course to fly towards the calculated reference location; a desired speed to fly towards the calculated reference location; a desired flying altitude, and; instruct the air vehicle to fly according to the generated guidance reference; wherein the determination of the detectability zone, the calculation of a reference location and the generation of at least one guidance reference are performed according to at least one predetermined behavior policy of the air vehicle.

In some examples, the desired speed at which the air vehicle flies towards the at least one reference location is calculated according to any combination of one or more of at least proportional, integral and derivative criteria, which mathematically combine any combination of one or more of at least the angular deviation and the radial deviation. In some examples, the desired speed to fly towards the reference location is calculated based on wind velocity local to the actual location of the air vehicle. In some examples, a predetermined behavior policy for determining the detectability zone is based on any combination of one or more of at least one of the moving target detects sound emitted by the air vehicle, wherein this probability is based on features of the air vehicle, and; probability that the moving target visually detects the air vehicle, wherein this probability is based on features of the air vehicle.

An example method of tracking a moving target from an air vehicle comprising determining an estimated location and speed of a moving target and instructing an air vehicle to follow the moving target, wherein the method further comprises: a) determining a detectability zone surrounding the moving target; b) calculating at least one reference location for the air vehicle; c) generating at least one guidance reference to command the air vehicle for tracking the moving target, wherein the guidance reference comprises any combination of one or more of at least: c.1) a desired course; c.2) a desired speed; c.3) a desired flying altitude; and wherein the method further comprises: d) instructing the air vehicle to fly according to the generated guidance reference; wherein the determination of the detectability zone, the calculation of a reference location and the generation of the guidance reference are performed according to at least one behavior policy.

The description of the different examples have been presented for purposes of illustration and description, and is not intended to be exhaustive or limited to the examples in the form disclosed. Many modifications and variations will be apparent to those of ordinary skill in the art. Furthermore, different examples may provide different advantages as compared to other advantageous examples.

The invention claimed is:

1. A computer-implemented method, comprising:
in response to an estimated speed and an estimated location of a moving target, determining a detectability zone surrounding the moving target; and
causing an air vehicle to follow the moving target outside of the detectability zone including:
1) determining a reference location of the air vehicle relative to the estimated location of the moving target, the reference location being outside of the detectability zone; and
2) determining a guidance reference to cause the air vehicle to follow the moving target.

2. The method of claim 1, wherein the detectability zone is a first detectability zone, further including determining a second detectability zone associated with a boundary beyond which the air vehicle is unlikely to detect the moving target.

3. The method of claim 2, wherein the boundary is a first boundary and the reference location is determined based on a second boundary of the detectability zone and the first boundary.

4. The method of claim 3, wherein if the estimated speed of the moving target is less than a minimum speed of the air vehicle, further including causing the air vehicle to traverse an area between the first boundary and the second boundary.

5. The method of claim 1, wherein the guidance reference includes at least one of a course for the air vehicle to fly, a speed for the air vehicle to fly, and an altitude for the air vehicle to fly.

6. The method of claim 5, wherein the reference location and the guidance reference are determined based on a behavior policy of the air vehicle.

7. The method of claim 6, wherein the behavior policy includes at least one of a maximum speed of the air vehicle or a minimum speed of the air vehicle.

8. The method of claim 5, wherein the speed is determined based on wind velocity local to the air vehicle.

9. The method of claim 5, wherein the speed is determined based on a difference between the estimated location of the moving target and the reference location of the air vehicle.

10. The method of claim 9, wherein the difference between the estimated location of the moving target and the reference location of the air vehicle is determined based on 1) an angular deviation between an actual location of the air vehicle and the reference location of the air vehicle; and 2) a radial deviation between the actual location of the air vehicle and the reference location of the air vehicle.

11. The method of claim 10, wherein the angular deviation is associated with the angular deviation between a first projection on a horizontal plane that links the moving target and the air vehicle and a second projection on the horizontal plane that links the moving target with the reference location.

12. The method of claim 11, wherein the radial deviation is associated with the radial deviation between a first circumference centered on the moving target and passing along the first projection and a second circumference centered on the moving target and passing along the second projection.

13. A computer-implemented method, comprising:
in response to an estimated speed and an estimated location of a moving target, determining a detectability zone surrounding the moving target based on one or more of a probability that sound emitted by an air vehicle is detectable at the moving target or a probability that the air vehicle is visually detectable from the moving target; and
causing an air vehicle to follow the moving target outside of the detectability zone.

14. A computer-implemented method, comprising:
in response to an estimated speed and an estimated location of a moving target, determining a detectability zone surrounding the moving target; and
causing an air vehicle to follow the moving target outside of the detectability zone based on the estimated speed of the moving target in relation to a maximum speed of the air vehicle and a minimum speed of the air vehicle.

15. A computer-implemented method, comprising:
in response to an estimated speed and an estimated location of a moving target, determining a detectability zone surrounding the moving target; and
causing an air vehicle to follow the moving target outside of the detectability zone along an estimated trajectory, the estimated trajectory determined when the estimated speed of the moving target is greater than a maximum speed of the air vehicle.

16. An article of manufacture comprising instructions, which, when executed, cause a machine to at least:
in response to an estimated speed and an estimated location of a moving target, determine a first detectability zone surrounding a moving target;
cause an air vehicle to follow the moving target outside of the first detectability zone; and determine a second detectability zone associated with a boundary beyond which the air vehicle is unlikely to detect the moving target.

17. An article of manufacture comprising instructions, which, when executed, cause a machine to at least:
in response to an estimated speed and an estimated location of a moving target, determine a detectability zone surrounding a moving target; and
cause an air vehicle to follow the moving target outside of the detectability zone including:
1) determining a reference location of the air vehicle relative to the estimated location of the moving target, the reference location being outside of the detectability zone; and
2) determining a guidance reference to cause the air vehicle to follow the moving target.

18. The method of claim 1, wherein the detectability zone defines a circular area in which the moving target is disposed adjacent a center of the circular area.

* * * * *